United States Patent
Crissy

(10) Patent No.: US 7,410,035 B2
(45) Date of Patent: Aug. 12, 2008

(54) DAMPER AND METHOD FOR TUNING A DAMPER UTILIZING A SURFACE CONTACT REDUCING RESILIENT MEMBER

(75) Inventor: Michael S. Crissy, Hanover, MI (US)

(73) Assignee: Metaldyne Company LLC, Plymouth, MI (US)

( * ) Notice: Subject to any disclaimer, the term of this patent is extended or adjusted under 35 U.S.C. 154(b) by 35 days.

(21) Appl. No.: 10/860,871

(22) Filed: Jun. 4, 2004

(65) Prior Publication Data

US 2005/0167213 A1    Aug. 4, 2005

Related U.S. Application Data

(60) Provisional application No. 60/541,310, filed on Feb. 3, 2004.

(51) Int. Cl.
*F16D 65/10* (2006.01)

(52) U.S. Cl. .............. 188/218 R; 188/218 A; 74/574.4; 464/66

(58) Field of Classification Search ............ 188/17, 188/26, 18 R, 378, 218 R, 218 A, 218 XL; 384/124, 125; 74/574.4; 464/66
See application file for complete search history.

(56) References Cited

U.S. PATENT DOCUMENTS

| | | | | |
|---|---|---|---|---|
| 1,791,495 A | * | 2/1931 | Frey ..................... | 188/218 A |
| 1,928,079 A | * | 9/1933 | Taylor .................. | 188/218 R |
| 2,012,838 A | * | 8/1935 | Tilden .................. | 188/218 A |
| 2,287,984 A | * | 6/1942 | Glazebrook ............ | 188/218 A |
| 2,897,026 A | * | 7/1959 | Haller et al. .......... | 384/125 |
| 2,931,412 A | * | 4/1960 | Wing .................... | 411/108 |
| 2,977,819 A | | 4/1961 | Haushalter | |
| 3,041,889 A | | 7/1962 | Haushalter | |
| 3,058,208 A | | 10/1962 | Haushalter | |
| 3,061,386 A | * | 10/1962 | Dix et al. .............. | 384/535 |
| 3,776,653 A | * | 12/1973 | Buzogany ............... | 403/372 |
| 4,395,809 A | | 8/1983 | Whiteley | |
| 4,493,471 A | | 1/1985 | McInnis | |
| 5,004,078 A | * | 4/1991 | Oono et al. ............ | 188/218 A |
| 5,201,528 A | * | 4/1993 | Upper ................... | 277/394 |
| 5,390,769 A | * | 2/1995 | Bair et al. ............ | 188/218 R |
| 5,496,216 A | * | 3/1996 | Rohrle et al. .......... | 464/66.1 |

(Continued)

FOREIGN PATENT DOCUMENTS

JP    01309822 A    12/1989

*Primary Examiner*—Christopher P Schwartz
(74) *Attorney, Agent, or Firm*—McDonald Hopkins LLC; Robert H. Earp, III; David J. Smith

(57) ABSTRACT

A damper and method for tuning a damper utilizing a surface contact reducing resilient member is disclosed. A damper for dampening torsional and bending vibrations in a rotating shaft includes a hub member, an inertia member spaced radially outwardly from the hub member, and a resilient member positioned under compression between the hub member and the inertia member. The resilient member has at least one protrusion extending axially thereon to reduce the amount of surface contact between the resilient member and the hub member or the inertia member. A method for tuning dampers is also disclosed wherein reducing the amount of surface contact between the resilient member and the hub member and inertia member allows the damper to achieve lower part frequency based primarily on the geometry of the resilient member.

20 Claims, 3 Drawing Sheets

U.S. PATENT DOCUMENTS 5,551,318 A * 9/1996 Fukushima .................. 74/574
5,749,269 A    5/1998 Szymanski et al.
5,855,257 A * 1/1999 Wickert et al. ........ 188/218 XL
6,386,065 B1   5/2002 Hodjat

* cited by examiner

DAMPER AND METHOD FOR TUNING A DAMPER UTILIZING A SURFACE CONTACT REDUCING RESILIENT MEMBER

REFRERENCE TO RELATED APPLICATIONS

The present application claims the benefit of priority to U.S. Provisional Patent Application Ser. No. 60/541,310 filed Feb. 3, 2004.

FIELD OF THE INVENTION

The present invention relates generally to damper devices that are used to dampen or reduce vibrations, and particularly, to a damper and method for tuning a damper utilizing a surface contact reducing resilient member.

BACKGROUND

Rotary shafts such as rotary driveshafts, propeller shafts, and crankshafts are often used in the power train and engine designs of modern automotive vehicles. Rotary driveshafts are used to drive the front wheels of front wheel driven vehicles, propeller shafts are used to drive the rear drive system in rear wheel driven vehicles, and crankshafts are used to transmit power from the engine to the power train. In studying the rotational movement of such rotary shafts, it is known that certain unbalanced rotation may occur at certain rotational speeds or due to uneven power input thereby causing undesirable vibrations. These undesirable vibrations often present themselves as bending and torsional forces within the shaft during rotation.

For many years, this problem has been recognized and a variety of devices have been constructed and used to lessen or dampen the resultant vibrations. One common form of a damper comprises an inner metal hub attached to a rotary shaft, an outer metal annular member or "inertia member", and an elastomer member positioned under compression between the hub and outer member. The hub directly executes the vibrations created by the shaft due to its rigid coupling thereto. The inertia member is coupled to the hub by the elastomer member and accordingly causes a phase lag between the oscillations of the hub and the corresponding oscillations of the inertia member thereby reducing or eliminating vibrations in the shaft.

Such dampers are designed or "tuned" to generate a prescribed vibrational frequency adjusted to the dominant frequency of the excited harmful vibrations. The damper converts or transfers the vibrational energy of the rotary driveshaft to the damper by resonance, and eventually absorbs the vibrational energy of the rotary driveshaft. In short, the damper attempts to cancel or negate vibrations that are induced onto or caused by the rotary driveshaft in normal operation of the drive train of the vehicle.

Elastomer members used in such known dampers exhibit a set part frequency based upon their rubber hardness and thickness. In the manufacture of such dampers, sometimes the part frequency needs to be lower than what can be achieved with the typical softest rubber compounds used in a typical sheet-like geometry. Therefore, there is a need in the art to develop an elastomer element that achieves lower part frequency independent of its composition or based primarily on its part geometry.

SUMMARY OF THE INVENTION

It is an object of the present invention to provide a damper that dampens or reduces the axial, radial, and torsional vibrations of a rotating shaft.

It is another object of the present invention to provide a resilient member for a damper that improves dampening performance based primarily on the part geometry.

It is yet another object of the present invention to provide a damper that permits tuning thereof through manipulation of the resilient member part geometry.

These and other objects are met by the present invention that provides a damper and method for tuning a damper utilizing a surface contact reducing resilient member that allows the damper to achieve lower part frequency based primarily on the geometry of the resilient member. A damper for dampening torsional and bending vibrations in a rotating shaft according to the present invention includes a hub member, an inertia member spaced radially outwardly from the hub member, and a resilient member positioned under compression between the hub member and the inertia member. The resilient member has at least one protrusion extending axially thereon to reduce the amount of surface contact between the resilient member and the hub member or the inertia member, thus enabling the damper to achieve lower part frequency. A method for tuning dampers is also disclosed wherein reducing the amount of surface contact between the resilient member and the hub member and inertia member enables the damper to achieve lower part frequency based primarily on the geometry of the resilient member.

By manipulating the part geometry of the resilient member to select the amount of surface contact between the resilient member and the inertia member and hub member, the damper of the present invention can effectively dampen or reduce shaft vibrations better than a similar resilient member of known sheet-like part geometry to achieve a lower part frequency. In other words, the resilient member of the present invention provides a part geometry able to achieve lower part frequencies while using the same rubber hardness through reducing surface area contact between the resilient member and the hub and/or inertia member.

DESCRIPTION OF THE DRAWINGS

Objects and advantages together with the operation of the invention may be better understood by reference to the following detailed description taken in connection with the following drawings, wherein.

DETAILED DESCRIPTION OF THE INVENTION

The present invention will now be described with reference to FIGS. 1 through 7. However, while the preferred embodiment of the present invention is described for use with an automotive driveshaft, it should be clear that the present invention can be used to dampen vibrations in any rotary shaft. Further, it should be noted that the damper of the present invention can dampen vibrations for not only a rotating shaft but a static mount. For example, the damper of the present invention could be mounted to a static transfer case so as to dampen vibrations caused by a rotating shaft. Therefore, while the damper of the present invention is described with reference to the preferred embodiment, use of the damper in static mount situations is also possible and is covered by the appended claims to the fullest extent possible.

Figure 1:
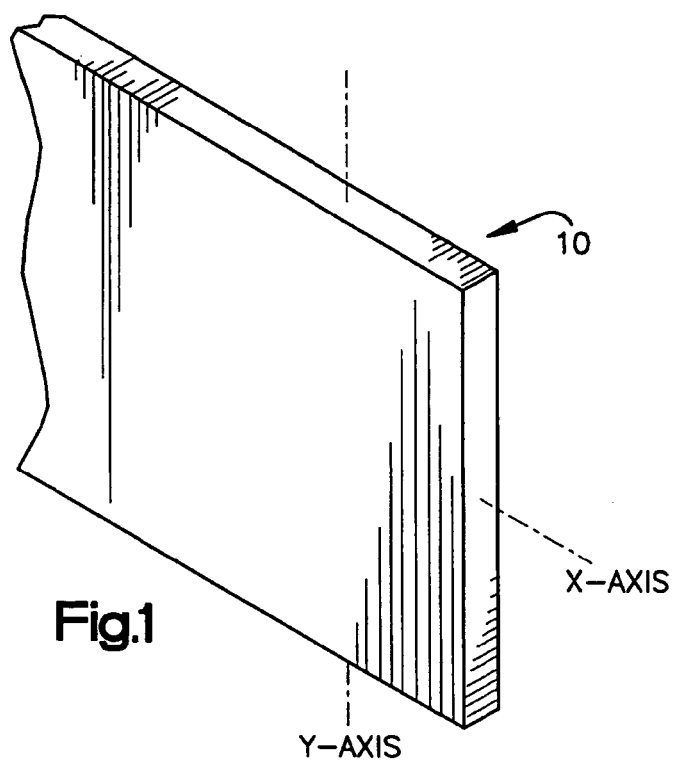
FIG. 1 is a perspective view of an elastomeric member previously known in the art for placement between a hub and inertia member to dampen vibration.

As shown in FIG. 1, the typical elastomer member comprises a sheet 10 of elastomeric material. The dimensions and rubber composition of the sheet 10 are chosen to dampen shaft vibrations when assembled under compression between a hub and an inertia member. For example, damper part frequency is typically lowered by utilizing softer rubber composition in the elastomer member or making the elastomer member thinner or narrower. However, there is a limit as to how thin or narrow the sheet 10 can be and how soft the rubber composition of the elastomeric material can be. Yet, sometimes the damper part frequency needs to be lower than what can be achieved with the softest rubber compound of a sheet-like geometry. These such limitations are overcome by the novel resilient member part geometry of the present invention.

Figure 2:
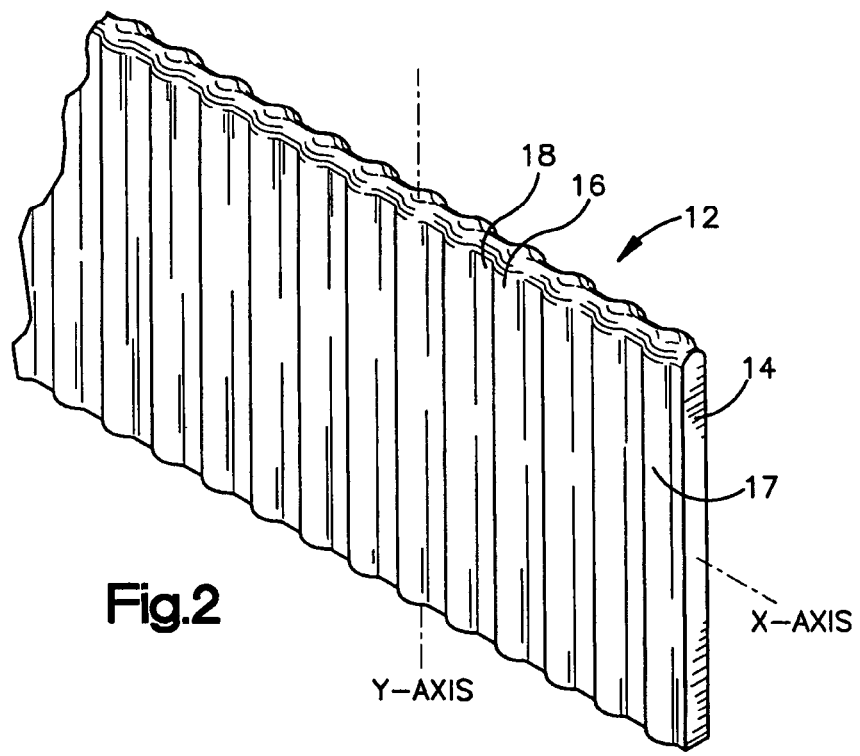
FIG. 2 is a perspective view of an elastomeric member according to the preferred embodiment of the present invention that achieves lower part frequencies versus the previously known elastomeric member of FIG. 1.
Figure 3:
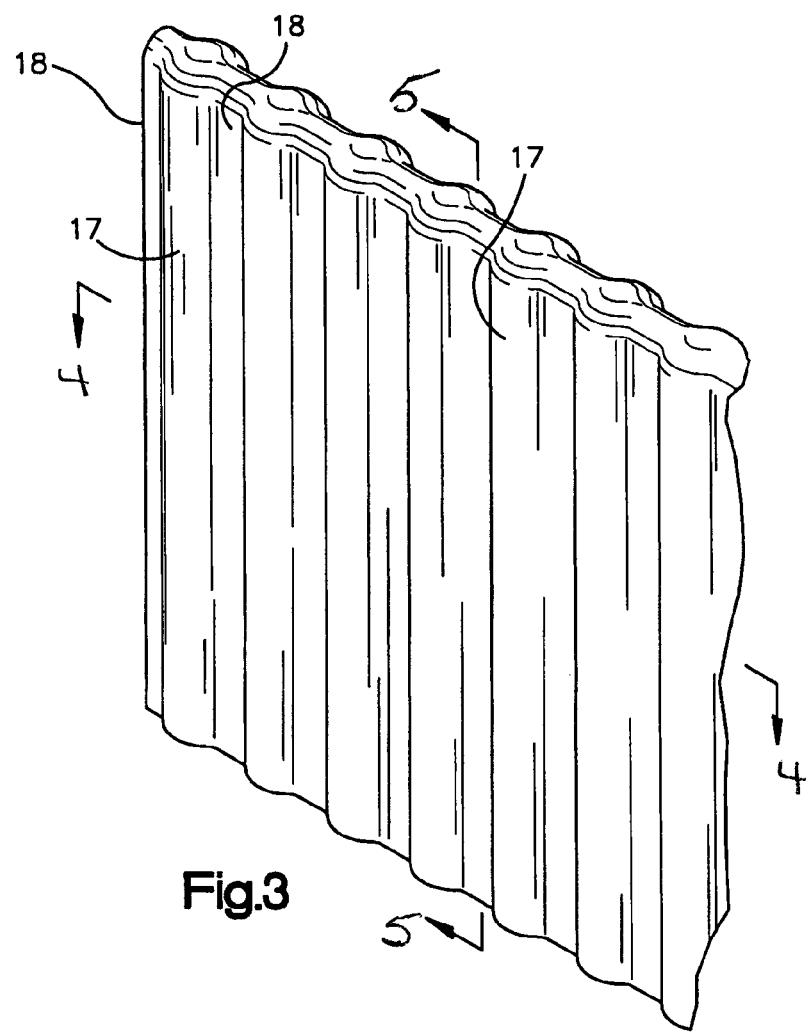
FIG. 3 is a partial isometric view of the elastomer strip member of FIG. 2.
Figure 4:
FIG. 4 is a cross-sectional view of the elastomeric member of FIG. 3 taken along line 4-4.
Figure 5:
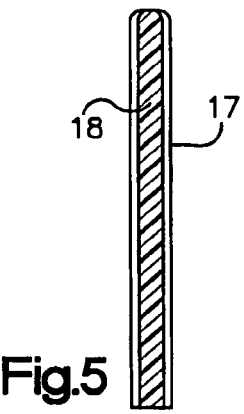
FIG. 5 is a cross-section view of the elastomeric strip member of FIG. 3 taken along line 5-5.

A damper for dampening torsional and bending vibrations in a rotating shaft, according to the present invention, generally comprises a hub member capable of connection to a rotating shaft, an inertia member spaced radially outwardly from the hub member, and a resilient member positioned under compression between the hub member and the inertia member. The resilient member 12 of the present invention is shown in FIG. 2 in its preferred embodiment and reduces part frequency based primarily upon its part geometry.

The resilient member 12 comprises an elastomeric sheet 14 having at least one outwardly extending protrusion 16 which extends from at least one surface of the sheet 14. When the damper is assembled, the outwardly extending protrusion 16 reduces the amount of surface contact between the resilient member 12 and the hub member and/or inertia member. Preferably, the protrusions 16 extend outwardly from both the inner and outer surfaces of the sheet 14 to reduce the amount of surface contact between the resilient member 12 and the hub member and inertia member.

As shown in FIGS. 2 through 5, the elastomeric sheet 14 is connected at either end to form an annular member, or may also be formed as a ring. The outwardly extending protrusions 16 of the elastomer sheet 14 preferably comprise a series of interconnected half-cylinders or curved portions 17. The cylinders 17 extend axially along the sheet 14 along the Y-axis and are interconnected along their length by web portions 18 which likewise extend axially along the sheet 14 along the Y-axis. However, it should be clear that numerous other protrusion geometries could be used to reduce surface contact between the hub member and inertia member and still be within the scope of the present invention. Other geometries could include protrusions having interconnected trapezoids, triangles, squares, curved sections, etc. or any part geometry that achieves a reduction in surface contact between the resilient member 12 and the hub member and/or inertia member.

Figure 6:
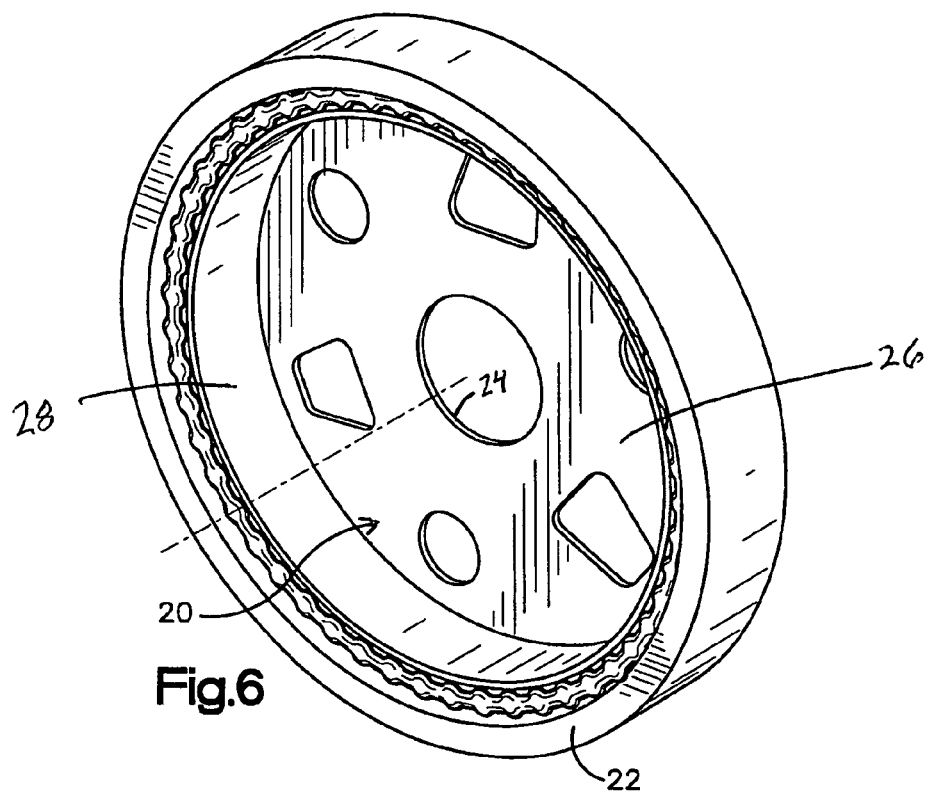
FIG. 6 is a perspective view of a damper assembly utilizing the elastomeric strip of FIG. 2.
Figure 7:
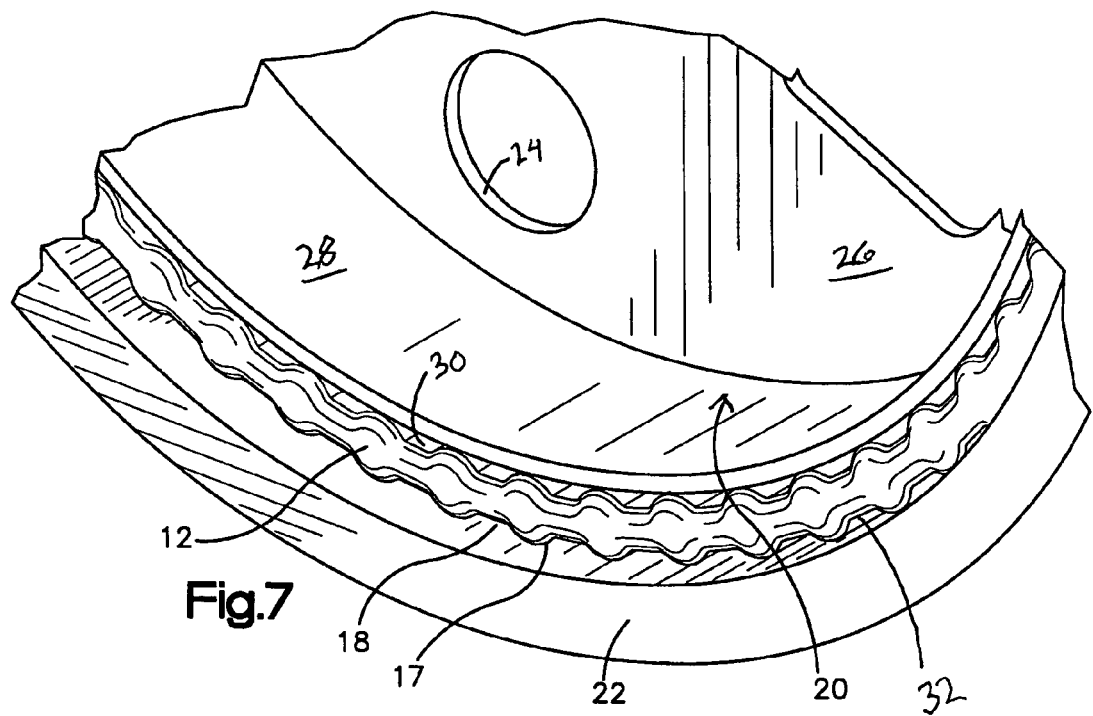
FIG. 7 is a magnified view of a portion of the damper assembly of FIG. 6.

As shown in FIGS. 6 and 7, the damper is assembled by providing a hub member 20 capable of connection to the driveshaft through any known means. As is known with dampers of conventional design, the damper of the preferred embodiment is secured to an automotive drive shaft through connection bolts. The hub member 20 includes a central hub 24 capable of connection to a rotating shaft, a web or series of spokes 26 extending radially outwardly from the central hub 24, and a rim 28 extending circumferentially about the web 26. It should be clear that the central hub 24 could comprise a structure which is itself connected to the rotating shaft, an aperture in the web merely connected to the rotating shaft, or a portion of the rotating shaft acting as a hub.

An inertia member 22 is spaced radially outwardly from the rim 28 and a resilient member 12 is positioned under compression between the rim 28 and the inertia member 22. The resilient member 12 has an inner surface 30 facing the rim 28 and an outer surface 32 facing the inertia member 22. At least one protrusion 16 extends axially along either the inner surface 30 or the outer surface 32 or both to reduce the amount of surface contact between said resilient member 12 and the rim 28 and the inertia member 22.

The resilient member 12 of the present invention is preferably comprised of an elastomeric material. The elastomeric material may consist of natural rubber or any suitable synthetic elastomeric composition such as styrene butadiene rubber, isoprene rubber, nitrile rubber, ethylene propylene copolymer, and ethylene acrylic. The hub and inertia members are preferably made from metal materials, such as steel, cast iron and aluminum. One common combination of materials utilizes automotive ductile cast iron (SAE J434) for the hub and automotive gray cast iron (SAE J431) for the annular ring. Another known combination of materials for the damper comprises die cast aluminum (SAE 308) for the hub and cast iron for the inertia member.

The construction of the damper of the present invention allows assembly in a conventional manner with conventional assembly tools and techniques. The hub member 20 and inertia member 22 are held in place in a jig or fixture (not shown) leaving an annular space for entry of the resilient member 12. The resilient member 12 is then formed into a ring shape, or could have been produced as a ring, and placed in an appropriate fixture over the annular space. The resilient member 12 could then post bonded to the inertia member and hub rim. First, the outer surface of the rim 28 and inner surface of the inertia member 22 are coated with a bonding agent such as "Chemlock" from Hughson Cements, a division of Lord Chemical. Hydraulic or pneumatic pressure is then used to force the resilient member 12 into the annular space. Finally, the damper is heated to activate the bonding agent. The resilient member could also be forced into the annular space without a bonding agent. Either way, the axially extending protrusions 16 of the resilient member 12 assist in the insertion of the resilient member 12 into the annular space.

The resilient member 12 is stretched and changed in cross-section when it is forced into the annular space. When set, the protrusions 16 reduce the surface contact between the resilient member 12 and the hub member 20 and the inertia member 22. Such a reduction in surface contact reduces the stiffness between the hub member 20 and inertia member 22 thereby greatly reducing part frequency.

Although the preferred embodiment of the present invention has been illustrated in the accompanying drawings and described in the foregoing detailed description, it is to be understood that the present invention is not to be limited to just the preferred embodiment disclosed, but that the inven-

Having thus described the invention, I claim:

1. A damper for dampening torsional and bending vibrations caused by a rotating shaft, the damper comprising:
    a hub member capable of being rigidly secured to a vibrating member;
    an inertia member spaced radially outwardly from the hub member; and
    a resilient member positioned under compression between the hub member and the inertia member, the resilient member having a web portion a protruding portion, the web portion connected to the protruding portion, wherein the thickness of the resilient member at the protruding portion is greater than the thickness of the resilient member at the web portion, and further wherein the resilient member causes a phase lag between oscillations of the hub member and corresponding oscillations of the inertia member.

2. The damper of claim 1 wherein the resilient member is elastomeric.

3. The damper of claim 1 wherein the vibrating member is a rotating shaft.

4. The damper of claim 1 wherein the vibrating member is a static member that vibrates in response to the vibrations of a rotating shaft.

5. The damper of claim 1 wherein the protruding portion has a substantially circular cross-section.

6. The damper of claim 1 wherein the resilient member substantially surrounds the hub member.

7. A damper for dampening torsional and bending vibrations caused by a rotating shaft, the damper comprising:
    a hub member capable of connection to a rotating shaft;
    an inertia member spaced radially outwardly from the hub member; and
    a resilient member positioned between the hub member and the inertia member comprising:
        a sheet having an inner surface facing the hub member and an outer surface facing the inertia member, and
        a protrusion projecting from at least one of the inner surface and the outer surface;
    wherein the resilient member causes a phase lag between oscillations of the hub member and corresponding oscillations of the inertia member.

8. The damper of claim 7 wherein the resilient member is annular and substantially surrounds the hub member.

9. The damper of claim 8 wherein the protrusion is substantially cylindrical in shape.

10. The damper of claim 8 wherein the resilient member is elastomeric.

11. The damper of claim 7 wherein the resilient member is positioned under compression between the hub member and the inertia member such that the protrusion is maintained in contact with the hub member or the inertia member.

12. The damper of claim 11 wherein the protrusion is maintained in contact with the hub member and the inertia member.

13. The damper of claim 7 wherein the resilient member has a first thickness at the sheet and a second thickness at the protrusion, the second thickness greater than the first thickness.

14. The damper of claim 7 wherein the protrusion projects from the inner surface.

15. The damper of claim 7 wherein the protrusion projects from the outer surface.

16. The damper of claim 7 wherein the protrusion projects from the outer surface and the inner surface.

17. A method for tuning a damper, the damper comprising a hub member, an inertia member spaced radially outwardly from the hub member, the method comprising the steps of:
    selecting a resilient member positionable between the hub member and the inertia member;
    determining the amount of stiffness for the damper having the resilient member;
    determining the number of web portions and the number of protusion portions of the resilient member required to reduce the stiffness of the damper a predetermined amount, wherein the thickness of the resilient member at the protrusion portions is greater than the thickness of the resilient member at the web portions; and
    positioning the resilient member under compression between the hub member and the inertia member.

18. The method of claim 17 wherein the resilient member causes a phase lag between oscillations of the hub member and corresponding oscillations of the inertia member.

19. The method of claim 17 wherein movement of the hub member with respect to the inertia member flexes the resilient member.

20. The method of claim 17 wherein the vibrating member is a rotating shaft.

* * * * *